(12) United States Patent
Solomon

(10) Patent No.: US 8,283,703 B2
(45) Date of Patent: Oct. 9, 2012

(54) SOLID STATE KLYSTRON

(75) Inventor: Paul M. Solomon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1398 days.

(21) Appl. No.: 11/870,875

(22) Filed: Oct. 11, 2007

(65) Prior Publication Data

US 2012/0181928 A1 Jul. 19, 2012

(51) Int. Cl.
*H01L 27/148* (2006.01)
(52) U.S. Cl. .............................. 257/250; 257/E21.179
(58) Field of Classification Search .................. 257/250, 257/E21.179
See application file for complete search history.

(56) References Cited

U.S. PATENT DOCUMENTS 2,242,275 A 5/1941 Varian

OTHER PUBLICATIONS

Avouris, Phaedon, et al., "Nanotube Electronics and Optoelectronics", Materials Today, vol. 9, No. 10, pp. 46-54, Oct. 2006.
Pennington, G., et al., "Semiclassical Transport and Phonon Scattering of Electrons in Semiconducting Carbon Nanotubes", Phys. Rev. B 68, 045426, 2003.
Perebeinos, Vasili, et al., "Electron-Phonon Interaction and Transport in Semiconducting Carbon Nanotubes", Phys. Rev. Lett. PRL 94, 086802, 2005.
Javey, Ali, et al., "High-Field Quasiballistic Transport in Short Carbon Nanotubes", Phys. Rev. Lett. vol. 92, 106804, No. 10, 2004.

*Primary Examiner* — Julio J Maldonado
*Assistant Examiner* — Amar Movva
(74) *Attorney, Agent, or Firm* — Scully, Scott, Murphy & Presser, P.C.; Vazken Alexanian

(57) ABSTRACT

A solid state Klystron structure is fabricated by forming a source contact and a drain contact to both ends of a conducting wire and by forming a bias gate and a signal gate on the conducting wire. The conducting wire may be at least one carbon nanotube or at least one semiconductor wire with long ballistic mean free paths. By applying a signal at a frequency that corresponds to an integer multiple of the transit time of the ballistic carriers between adjacent fingers of the signal gate, the carriers are bunched within the conducting wire, thus amplifying the current through the solid state Klystron at a frequency of the signal to the signal gate, thus achieving a power gain.

16 Claims, 7 Drawing Sheets

SOLID STATE KLYSTRON

FIELD OF THE INVENTION

The present invention relates to semiconductor structures and method of manufacturing and operating the same, and particularly to solid state Klystron structures and methods of manufacturing and operating the same.

BACKGROUND OF THE INVENTION

With the realization that end of scaling for conventional complementary metal-oxide-semiconductor (CMOS) integrated circuits is fast approaching in the semiconductor industry, alternative nanostructures and materials have been investigated. Of such nanostructures and materials, carbon nanotubes (CNTs) offer excellent intrinsic properties that are suitable for high performance nanoscale devices.

A key advantage of CNTs over conventional CMOS devices is that scaling limitations of metal-oxide-semiconductor field effect transistors (MOSFETs) due to boundary scattering of electrons from imperfect interfaces are solved naturally in CNTs which have a smooth, well coordinated graphene structure with no bonds to the outside. This enables CNTs to retain excellent transport properties to much smaller lateral dimensions than silicon. The small radius and possibility of completely surrounding the CNT by a gate provide excellent electrostatic confinement of channel electrons, enabling the channel length to be scaled down to very small dimensions, and their small size would enable high packing densities. Band structure calculations of CNTs according to P. Avouris and J. Chen, "Nanotube electronics and optoelectronics," Materials Today, 9, 46 (2006) show that conduction and valence bands are mirror images of each other, i.e., both electrons and holes should share equally good transport properties. This indicates suitability of CNTs for a general-purpose high-performance complementary circuit technology.

As is now well known, CNTs can be either metallic or semimetallic, depending on their chirality and have a bandgap which is inversely proportional to their diameter for the semiconducting tubes. The idealized electron/hole dispersion relation is hyperbolic in shape, with a quasi parabolic "effective mass" regime at lower energies and a linear "constant velocity" regime at higher energies, where the limiting velocity, $v_{lim}$, is ~5-10×10$^7$ cm/sec according to G. Pennington and N. Goldsman, "Semiclassical transport and phonon scattering of electrons in semiconducting carbon nanotubes," Phys. Rev. B 68, 045426 (2003).

Transport properties are further enhanced by the weak coupling of the charge carriers to acoustic phonons and the fact that the optical phonons have large energies of ~0.15 eV. All of these factors lead to extraordinarily large mobilities, reported at ~10$^5$ cm$^2$/V-sec at room temperature by Perebeinos et al., "Electron-Phonon Interaction and Transport in Semiconducting Carbon Nanotubes," Phys Rev. Lett. 94, 086802 (2005).

The intrinsic properties of CNTs make them good candidates for ballistic transport, and several signatures for ballistic transport have been found, for example, in Javey et al., "High-Field Quasiballistic Transport in Short Carbon Nanotubes," Phys. Rev. Lett., 92, 106804 (2004). The excellent ballistic transport properties of CNTs may be surpassed only by the ballistic transport properties of electrons in vacuum tubes.

According to U.S. Pat. No. 2,242,275 to Varian, a vacuum tube Klystron as an ultra-high frequency amplifier is disclosed. The '275 patent is incorporated herein by reference to illustrate the operating principle of a vacuum tube Klystron.

Referring to FIG. 1, a schematic diagram demonstrating the operating principles of a vacuum tube Klystron is shown. The vacuum tube Klystron consists of an electron stream within a vacuum enclosure (not shown), confined by a magnetic filed to a tight beam. Electrons are emitted from the cathode by thermionic emission and are accelerated by the positive potential $V_0$ at the anode. A series (two or more) of microwave cavities are placed along the electron beam so that the microwave electric field modulates the velocity of the electron stream and causes bunching of the electrons. This results in a strongly amplified current and is the basis for the success of the vacuum tube Klystron as an ultra-high frequency amplifier and generator with extensive use in radar applications.

Obviously, vacuum tube Klystrons are bulky vacuum tube devices that cannot be easily integrated with solid state devices in a circuit despite their excellent ultra-high frequency amplification characteristics.

Therefore, there exists a need for a solid state ultra-high frequency amplifier device that utilizes ballistic transport property of a semiconductor material and methods of operating the same.

SUMMARY OF THE INVENTION

The present invention provides a solid state Klystron (SSK) that utilizes ballistic transport properties of a semiconductor material to amplify current at an ultra-high frequency of approximately 1 THz. The correlated nature of ballistic transport is utilized to achieve amplification at frequencies well beyond transit-time limitations.

Specifically, the present invention provides a carbon nanotube solid state Klystron (CNT SSK) that utilizes ballistic transport properties of carbon nanotubes to amplify current at an ultra-high frequency. Furthermore, the present invention provides a semiconductor solid state Klystron (SSSK) that utilizes semiconductor material with long ballistic mean free paths instead of carbon nanotubes for ballistic transport of electrons or holes.

According to a first embodiment of the present invention, a carbon nanotube solid state Klystron (SSK) comprises:

at least one carbon nanotube;
a source contact to the at least one carbon nanotube;
a drain contact to the at least one carbon nanotube;
a signal gate with at least two signal fingers, wherein the at least two signal fingers are located on the at least one carbon nanotube and between the source contact and the drain contact; and
a bias gate with at least one bias finger, wherein the at least one bias finger is located on the at least one carbon nanotube.

Preferably, the at least one bias finger is located between the at least two signal fingers. In one case, each of the at least one bias finger may be located between two signal fingers and the number of the at least two signal fingers is greater than the number of the at least one bias fingers by at least one, and preferably by one. In another case, there may be an additional bias finger that is located outside the at least two signal fingers, and the number of the at least two signal fingers is equal to or less than the number of the at least one bias fingers.

Preferably, the at least one carbon nanotube comprises a semiconducting nanotube. More preferably, each of the at least one carbon nanotube is a semiconducting nanotube.

Preferably, each of the source contact, the drain contact, the bias gate and the signal gate comprise a metal.

For optimal amplification of current, a width of each of the at least one signal finger is equal to or less than about ½ of the smallest spacing between adjacent signal fingers, and is preferably equal to or less than about ⅓ of the smallest spacing between adjacent signal fingers.

The diameter of the at least one carbon nanotube is in the range from about 1.0 nm to about 10 nm, and preferably in the range from about 1.7 nm to about 3 nm.

According to a second embodiment of the present invention, a semiconductor solid state Klystron (SSSK) comprises:

at least one semiconductor wire;

a source contact to the at least one semiconductor wire;

a drain contact to the at least one semiconductor wire;

a signal gate with at least two signal fingers, wherein the at least two signal fingers are located on the at least one semiconductor wire and between the source contact and the drain contact; and a bias gate with at least one bias finger, wherein the at least one bias finger is located on the at least one semiconductor wire.

The at least one semiconductor wire comprises a material with long ballistic mean free paths, which is preferably on the order of the length of the at least one semiconductor wire. For example, the at least one semiconductor wire may comprise a material selected from the group consisting of InAs and $In_xGa_{1-x}As$, wherein x is in the range from above 0 to below 1.

Preferably, the at least one bias finger is located between the at least two signal fingers. In one case, each of the at least one bias finger may be located between two signal fingers and the number of the at least two signal fingers is greater than the number of the at least one bias fingers by at least one, and preferably by one. In another case, there may be an additional bias finger that is located outside the at least two signal fingers, and the number of the at least two signal fingers is equal to or less than the number of the at least one bias fingers.

Preferably, each of the source contact, the drain contact, the bias gate and the signal gate comprise a metal.

For optimal amplification of current, a width of each of the at least one signal finger is equal to or less than about ½ of the smallest spacing between adjacent signal fingers, and is preferably equal to or less than about ⅓ of the smallest spacing between adjacent signal fingers.

The width of each semiconductor wire has to be narrow enough so that the transport along the wire is essentially one-dimensional in nature i.e. the electron motion is collimated along the length of the wire. Preferably, the width of the at least one semiconductor wire is in the range from about 2.0 nm to about 40 nm and the thickness of the at least one semiconductor wire is in the range from about 2.0 nm to about 40 nm.

According to the present invention, a method of fabricating a carbon nanotube solid state Klystron (CNT SST) comprises:

forming a source contact and a drain contact;

forming at least one carbon nanotube, wherein the source contact and the drain contact are in contact with the at least one carbon nanotube forming a thin dielectric layer, wherein the thin dielectric layer is in contact with the at least one carbon nanotube;

forming a signal gate with at least two signal fingers, wherein the at least two signal fingers are in contact with the thin dielectric layer; and forming a bias gate with at least one bias finger, wherein the at least one bias finger is in contact with the thin dielectric layer.

The source contact and drain contact may be formed prior to the formation of the at least one carbon nanotube. Alternatively, the source contact and drain contact may be formed after the formation of the at least one carbon nanotube.

The thin dielectric layer may be formed after the formation of the at least one carbon nanotube and is deposited on and surrounds the at least one carbon nanotube. At least one of the signal gate and the bias gate may be formed thereafter.

Alternatively, the at least one of the signal gate and the bias gate may be formed prior to the formation of the thin dielectric layer followed by the formation of the at least one carbon nanotube.

The at least one carbon nanotube may be a single carbon nanotube or may be multiple parallel carbon nanotubes.

According to the present invention, a method of operating a solid state Klystron comprises:

providing a solid state Klystron having at least one conducting wire, a source contact to the at least one conducting wire, a drain contact to the at least one conducting wire, a bias gate with at least one bias finger, and a signal gate with at least two signal fingers;

applying a first DC voltage bias between the source contact and the drain contact;

applying a second DC voltage bias between the source contact and the bias gate; and applying an AC voltage signal to the signal gate.

The conducting wire may be a carbon nanotube or a semiconductor wire. The first DC voltage, the second DC voltage, and the spacing between each adjacent signal fingers are adjusted such that the transit time of carriers between an adjacent pair of the at least two signal fingers is an integer multiple of the inverse of the frequency of the AC voltage signal, which is the period of the AC voltage signal. If the signal gate has at least three signal fingers, carrier transit times between adjacent signal fingers, which are the average amounts of time that the carriers take to move from one signal finger to the next signal finger, are preferably substantially the same for all pairs of adjacent signal fingers.

The AC voltage signal is preferably an ultra-high frequency signal with a frequency higher than 1 GHz, more preferably higher than 100 GHz, and most preferably higher than 1 THz. Carrier bunching is induced within the at least one conducting wire to produce power gain.

DETAILED DESCRIPTION OF THE INVENTION

As stated above, the present invention relates to solid state Klystron structures and methods of manufacturing and operating the same, which is now described in detail with accompanying figures.

Figure 1:
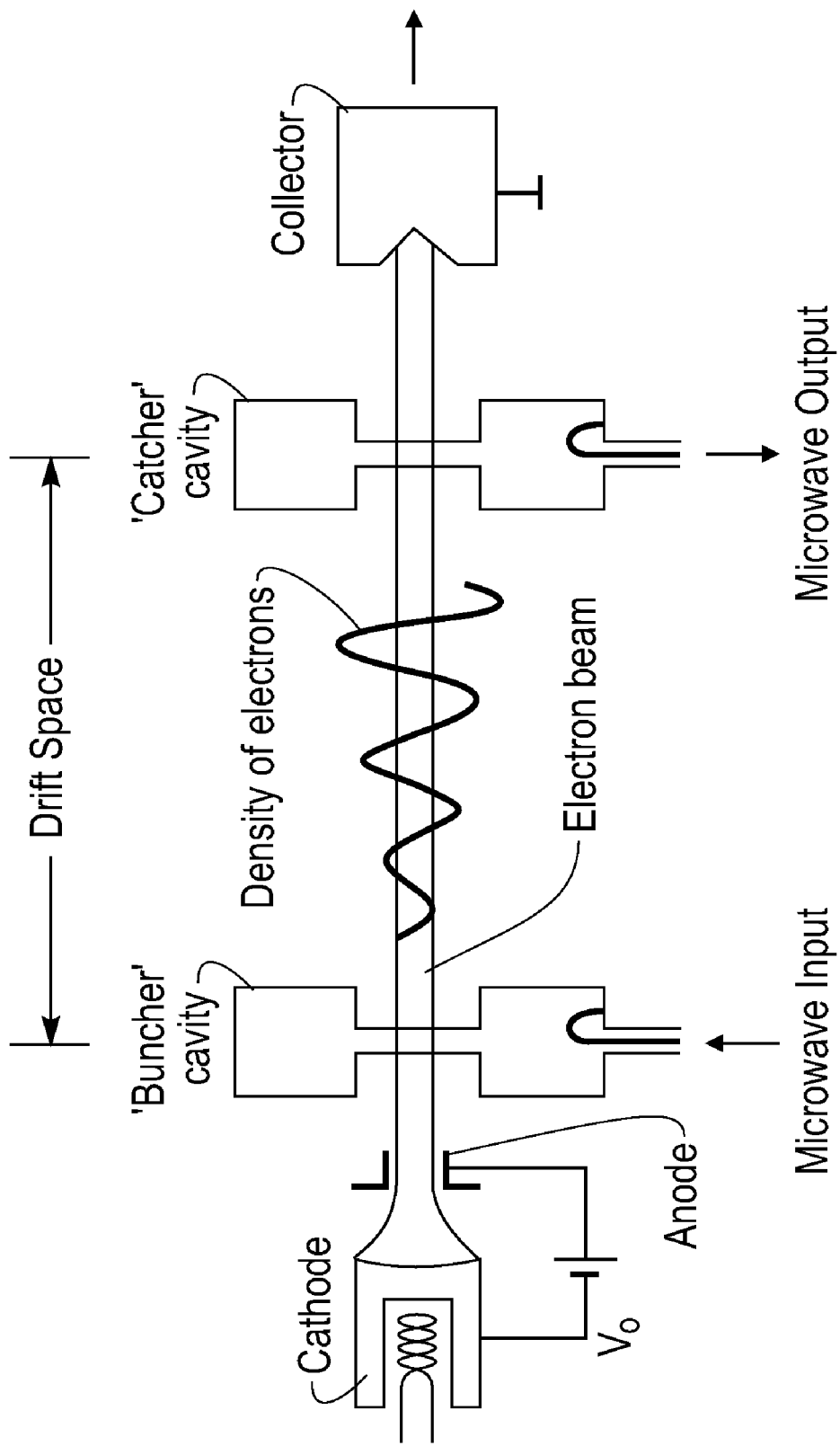
FIG. 1 is a schematic diagram of a prior art vacuum tube Klystron, which is reproduced from www.answers.com/topic/klystron.
Figure 2:
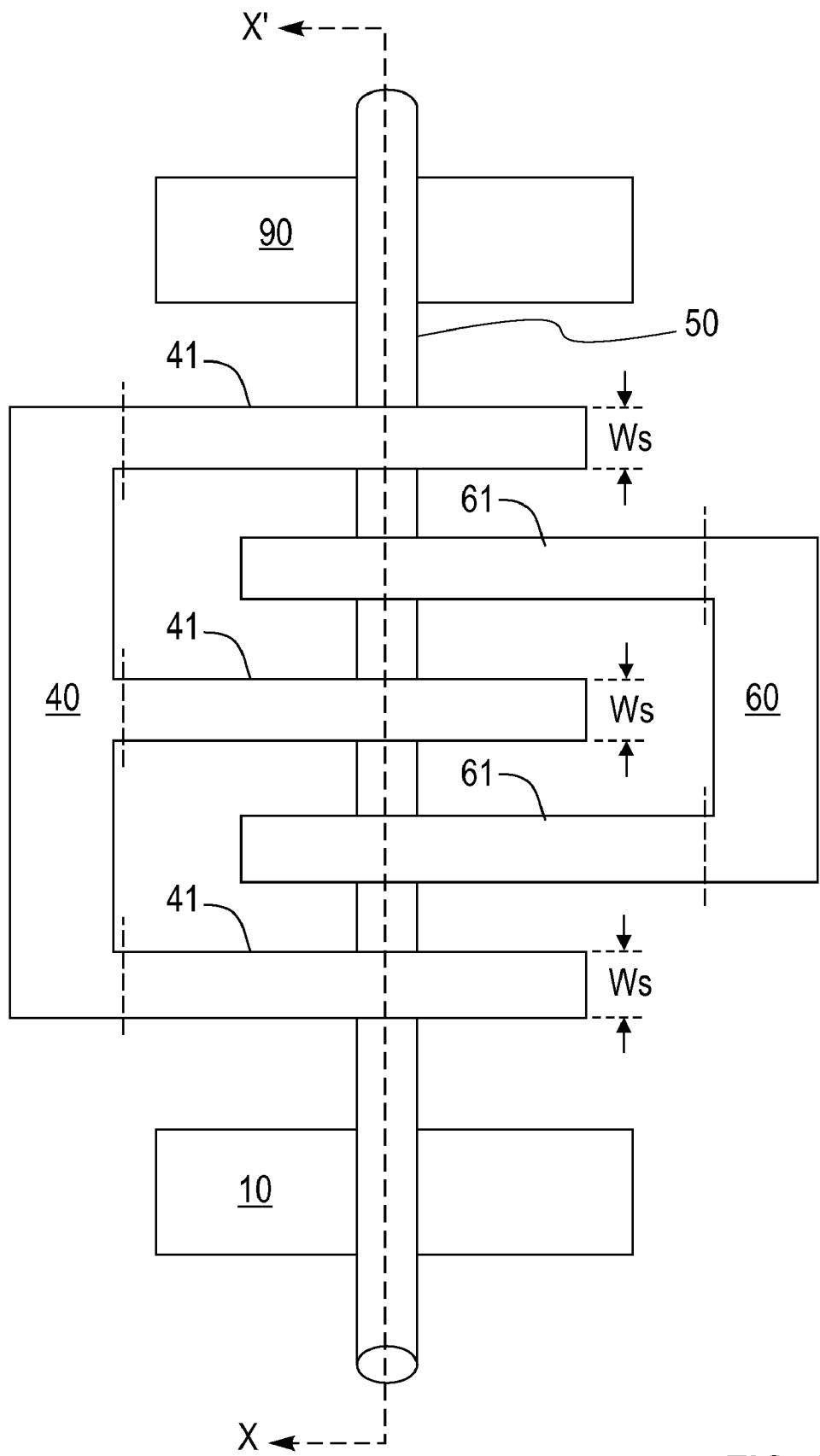
FIG. 2 is a structure of a 2-period (3 signal fingers) solid state Klystron with one conducting wire according to the present invention.

Referring to FIG. 2, a top-down view of an exemplary solid state Klystron comprising a conducting wire 50, source contact 10, a drain contact 90, a bias gate 60 having two bias fingers 61, and a signal gate 40 having three signal fingers 41 is shown. The carriers, e.g., electrons or holes, flow from the source contact 10, through the conducting wire 50, to the drain contact 90 in a ballistic transport by an applied suitable first DC voltage bias between the drain contact 90 and the source contact 10. To facilitate the ballistic transport of the carriers, the material for the conducting wire 50 is chosen such that ballistic mean free paths within the conducting wire 50 are long, that is, comparable to the dimension of the length of the conducting wire 50. The carriers are provided by a suitable second DC voltage bias between the bias gate 60 and the source contact 10.

The first DC voltage bias across the drain contact 90 and the source contact 10 is on the order of or less than 1.0 V to prevent loss of ballisticity through emission of ballistic phonons. Likewise, the second DC voltage bias across the bias gate 60 and the source contact 10 is also on the order of 1.0 V. However, the second DC voltage bias may exceed 1.0V as needed. The second DC voltage bias may exceed, may be the same as, or may be less than the second DC bias voltage.

According to the present invention, the minimum number of signal fingers 41 of the signal gate 40 is two. More than two signal fingers 41 may be employed to increase the gain of the SSK. The signal fingers 41 are located on the conducting wire 50. The signal fingers 41 contact a thin dielectric layer (not shown in FIG. 2) which contacts the conducting wire 50. The signal fingers 41 may be located on one side of the conducting wire 50 or they may surround the conducting wire 50. The carriers, that is, electrons or holes, are confined within the conducting wire 50 and do not flow into the bias gate 60 or into the signal gate 40 due to the thin dielectric layer.

According to the present invention, the spacing between adjacent signal fingers 41 of the signal gate 40 are adjusted such that the carrier velocity is in resonance with the AC voltage signal applied to the signal fingers 41, that is, carriers that are accelerated by the AC voltage signal at the first signal finger (the signal finger closest to the source contact 10) are again accelerated by the AC voltage signal at the next signal finger. This is achieved by matching the transit time of carriers between an adjacent pair of the signal fingers 41 to an integer multiple of the period of the AC signal, that is, the inverse of the frequency of the AC voltage signal. If the signal gate 40 has at least three signal fingers 41, preferably, all transit times between adjacent pairs of the signal fingers 41 are integer multiples of the inverse of the frequency of the AC voltage signal. Most preferably, carrier transit times between adjacent signal fingers 41 are substantially the same for all pairs of adjacent signal fingers.

For optimal amplification of current, the width Ws of the signal fingers 41 should not exceed the width of the 'bunched' carriers, or the pulse width of the carriers. Therefore, the width Ws of the signal fingers 41 is equal to or less than about ½ of the smallest spacing between adjacent signal fingers 41, and preferably equal to or less than about ⅓ of the smallest spacing between adjacent signal fingers 41.

According to the present invention, at least one bias finger 61 is located between a pair of adjacent signal fingers 41. The number of the signal fingers 41 may be greater than the number of the bias fingers 61 by at least one. Preferably, one bias finger 61 is located between each pair of adjacent signal fingers 41, and therefore, the number of the signal fingers 41 is greater than the number of the bias fingers 41 by one.

According to the first embodiment of the present invention, the conducting wire 50 is a carbon nanotube, and is preferably a semiconducting carbon nanotube. In this embodiment, the room temperature mean free path of carriers in a carbon nanotube is about 1 micron, or 1,000 nm, and correspondingly, the distance between the source contact 10 and the drain contact 90 in a carbon nanotube SSK for a room temperature operation may be up to about 1 micron. At low temperatures, acoustic phonons are suppressed, thereby increasing the mean free path of carriers. Consequently, the distance between the source contact 10 and the drain contact 90 in a carbon nanotube SSK for a low temperature operation may exceed 1 micron and may be above 10 microns.

Figure 3:
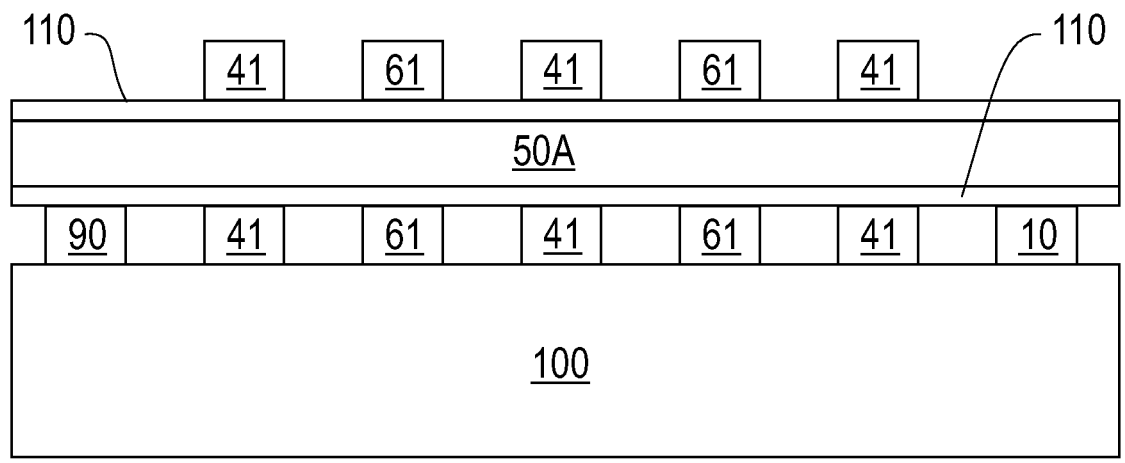
FIG. 3 is a schematic cross-section of an exemplary carbon nanotube solid state Klystron according to the first embodiment of the present invention along the plane of X-X' in FIG. 2.

FIG. 3 shows a vertical cross-section of an exemplary carbon nanotube solid state Klystron (CNT SSK) according to the first embodiment of the present invention along the direction of X-X' in FIG. 2. According to an exemplary process for the formation of the CNT SSK, an insulating layer 100 may be formed on a semiconductor substrate or on an insulator substrate. Alternatively, the insulating layer 100 may be the substrate. Non-limiting exemplary materials for the insulating layer 100 include quartz ($SiO_2$), deposited silicon oxide, aluminum oxide, and silicon nitride. The source contact 10 and the drain contact 90 may be formed at this stage by deposition of a metal and lithographic patterning. A carbon nanotube 50A is formed on the source contact 10 and the drain contact 90 utilizing techniques well known in the art. A thin dielectric layer 110 is formed on and surrounds the carbon nanotube 50A. The thin dielectric layer 110 may be, for example, an aluminum oxide layer deposited by an atomic layer deposition (ALD) at a thickness of about 10 nm. Bias fingers 61 and signal fingers 41 are formed directly on the thin dielectric layer 110, preferably by deposition of a gate metal layer and lithographic patterning.

Alternatively, the source contact 10 and the drain contact 90 may be formed after the gate metal is formed. In this case, two end portions of the thin dielectric layer 110 are etched to expose the carbon nanotube 50A and a layer of metal is deposited and patterned over the exposed portions of the carbon nanotube to form the source contact 10 and the drain contact 90. In another implementation, at least one of the signal gate 40 and the bias gate 60 may be formed prior to forming the carbon nanotube 50A.

The fabrication of a single conducting wire follows well established lithographic procedures such as deep ultraviolet (DUV) lithography. For the finest finger to finger pitch, however, electron beam lithography may be utilized instead of DUV lithography. In an exemplary case of a CNT SSK with a three finger signal gate 40 and a two finger bias gate 60, which has an equal spacing between each adjacent pair of the signal fingers 41 and between each adjacent pair of the bias fingers 61, and an equal width for each of the signal fingers 41 and for each of the bias fingers 61 such that the width of the signal fingers 41 and the bias fingers 61 is ⅓ of the spacing between a pair of adjacent signal fingers 41, the distance between the source contact 10 and the drain contact is equal to the sum of the distance from the source to the first source finger, 9 times the width Ws of one of the signal fingers 41, and the distance from the last source finger to the drain contact. If the width Ws of one of the signal fingers 41 is about 40 nm, the length of the CNT SSK can be about 500 nm, which is well less than the length of ballistic mean free path of carriers in a carbon nanotube at room temperature.

According to the second embodiment of the present invention, the conducting wire 50 is a semiconductor wire which comprises a semiconductor material with a long carrier mean free path. For example, the semiconductor wire may comprise InAs and $In_xGa_{1-x}As$ with the value of x ranging from above 0 to below 1, which has a relatively long mean free path of about 50 nm at room temperature. The distance between the source contact and the drain contact is preferably less than the room temperature mean free path in a semiconductor SSK for room temperature operation. As in the first embodiment, the distance between the source contact and the drain contact may be increased for a semiconductor SSK for a low temperature operation.

Figure 4:
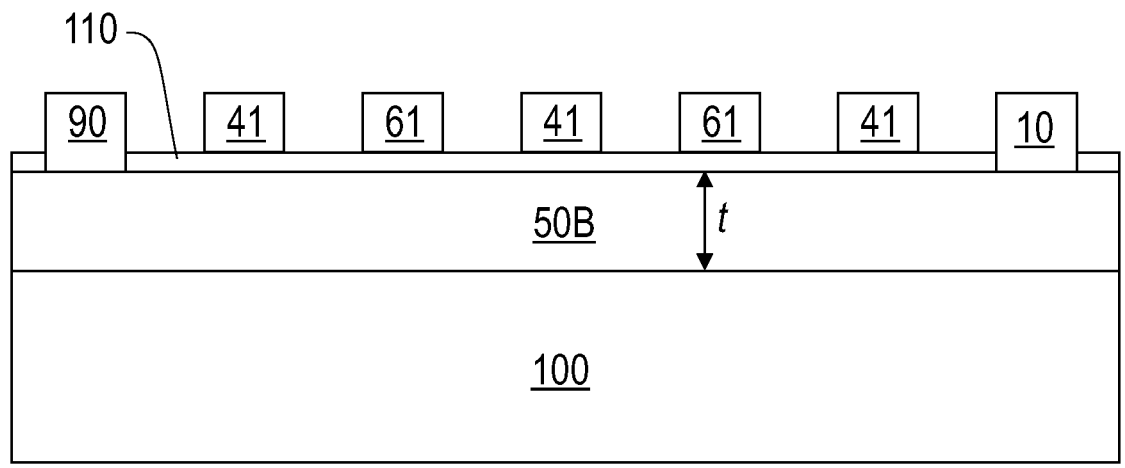
FIG. 4 is a schematic cross-section of an exemplary semiconductor wire solid state Klystron according to the second embodiment of the present invention along the plane of X-X' in FIG. 2.

FIG. 4 shows a vertical cross-section of an exemplary semiconductor solid state Klystron (SSSK) according to the second embodiment of the present invention along the direction of X-X' in FIG. 2. According to an exemplary process for the formation of the SSSK, an insulating layer 100 is formed on a semiconductor substrate or on an insulator substrate. Alternatively, the insulating layer 100 may be the insulating substrate. A semiconductor material with a long ballistic mean free path, for example, $In_xGa_{1-x}As$ with the value of x ranging from above 0 to below 1, and preferably about 0.4, is deposited and lithographically patterned to form a semiconductor wire 50B. The width of the semiconductor wire 50B is preferably in the range from about 2.0 nm to about 40 nm and the thickness t of the semiconductor wire 50B is in the range from about 2.0 nm to about 40 nm. A thin dielectric layer 110 is formed over the semiconductor wire 50B. The thin dielectric layer 110 may, for example, comprise an $In_yAl_{1-y}As$ layer, with the value of y ranging from above 0 to below 1, and preferably about 0.6, according to the second embodiment. A first conducting material, preferably a metal with high conductivity, is deposited and patterned to form the bias fingers 61 and the signal fingers 41 directly on the insulating layer 100. Portions of the thin dielectric layer 110 are etched to exposed the underlying semiconductor wire 50B near the ends, followed by a deposition of a second conducting material and lithographic patterning to form a source contact 10 and a drain contact 90.

While the conductor wire 50 is formed prior to the formation of the bias gate and the signal gate in the exemplary processes, one skill in the art would recognize that the order may be reversed in both embodiments with minor structural modifications. Such alterations in the order of processing and resulting changes in the structures of CNT SSK and SSSK in both embodiments of the present invention are herein explicitly contemplated.

Furthermore, each of the signal gate 40 and the bias gate 60 may be formed prior to the formation of the conductive wire 50 or after the formation of the conductive wire 50 as long as a thin dielectric layer 110 is formed between the conductive wire 50 and each of the signal gate 40 and the bias gate 60. If desired, the signal gate 40 and the bias gate 60 may be formed separately. Multiple thin dielectric layers 110 may be utilized as necessary.

Figure 5:
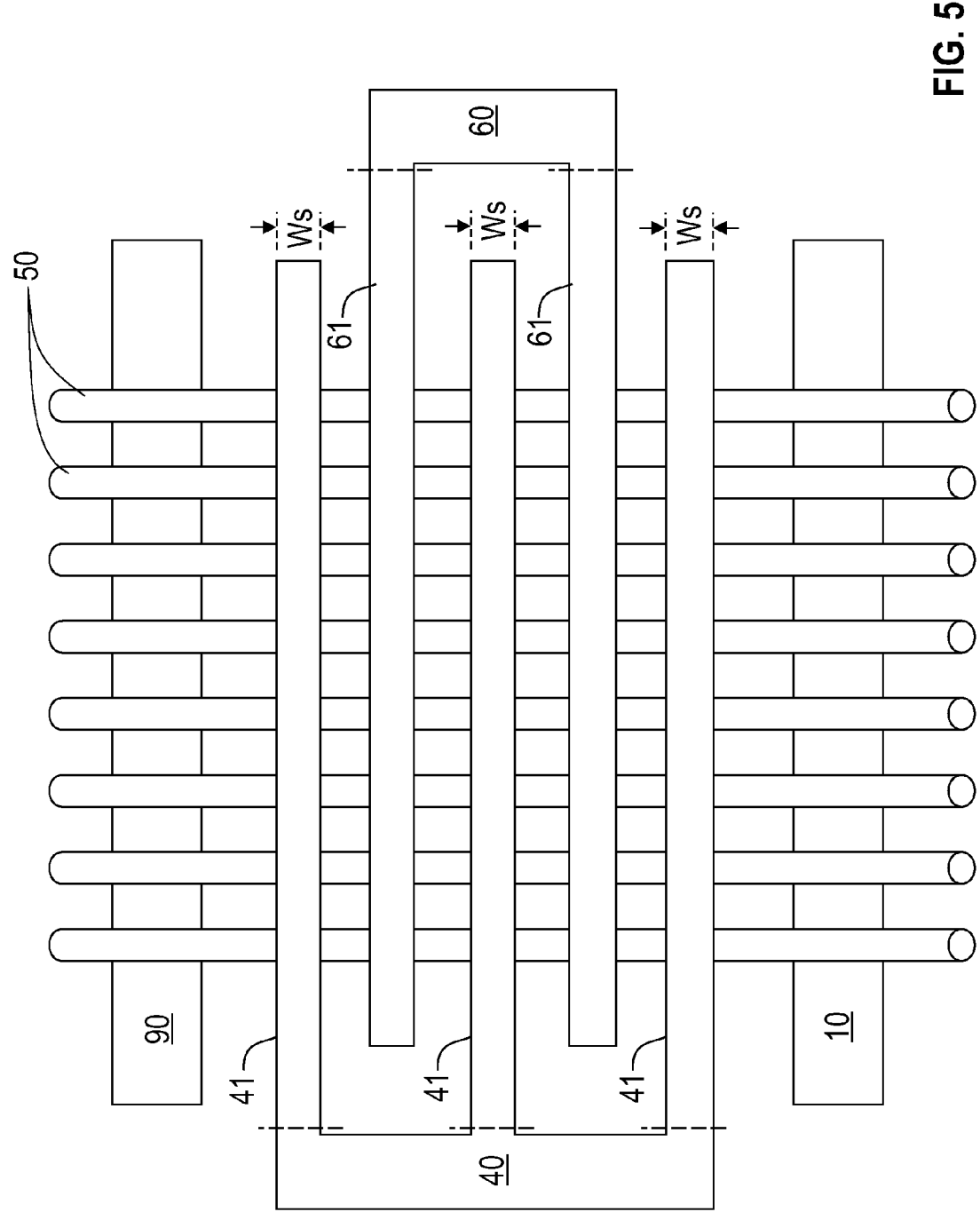
FIG. 5 is a structure of a 2-period (3 signal fingers) solid state Klystron with multiple conducting wires according to the present invention.

While the gain of the SSK may be increased by adding more signal fingers to the SSK, the distance between the source contact 10 and the drain contact 90 is limited due to the finite ballistic mean free paths. Furthermore, the parasitic capacitance of the SSK also increases with increasing number of signal fingers 41. To increase the output power and to reduce the effect of parasitic resistance, multiple conducting wires are used as shown in FIG. 5.

Such a multiple conducting wire configuration is possible in both the first and the second embodiments. According to the first embodiment, typical power levels of about 1 μW per carbon nanotube are possible based on peak signal amplitude of about 0.1V and DC current levels of about 10 μA. About 100 parallel carbon nanotubes would be able to match a 50 Ohm load and give power output levels of about 1 mW. The carbon nanotubes need to be well matched in their characteristics in order that the currents in different carbon nanotubes be in phase with each other.

In terms of the operating principle, the carbon nanotube solid state Klystron (CNT SSK) according to the first embodiment of the present invention and the semiconductor solid state Klystron (SSSK) according to the second embodiment of the present invention are direct descendents of vacuum tube Klystrons, where ballistic transport is the norm, but on a vastly smaller scale. A conducting wire 50 that allows a ballistic transport of carriers within, such as a carbon nanotube 50A or a semiconductor wire 50B, replaces the vacuum tube. The walls of the carbon nanotube or the walls of the semiconductor wire confine the electrons radially, so that a confining magnetic field is not necessary. The source contact 10 and the drain contact 90 replace the cathode and anode of a vacuum tube Klystron respectively. The multi-finger signal gate 40 replaces the microwave cavities. The bias gate 60 between fingers create drift region. The bias gate 60 is functionally analogous to the anode of a vacuum tube Klystron. Because of the close proximity of the multiple fingers of the signal gate 40, the longitudinal field developed between the signal fingers 41 and the bias fingers 61 is sufficiently large that no resonant cavity is required here. Even though electrons move much slower in carbon nanotubes 50A or in semiconductor wires 50B compared with a vacuum tube (by a factor of about 100×), the dimension between the source contact 10 and the drain contact 90 of the carbon nanotube 50A or of the semiconductor wire 50B is at least thousands of times smaller than the dimension between the cathode and the collector of a vacuum tube Klystron, enabling ultra-high frequency amplification of signals.

Simulation of the SSK according to the present invention shows that the kinetic energy in the channel may be increased beyond the applied gate voltages by suitably timing the gate signals with respect to the ballistic transit-time between gates. When distances between signal fingers 41 of the signal gate 40 are less than 1 μm, terahertz amplification may be possible.

Figure 6:
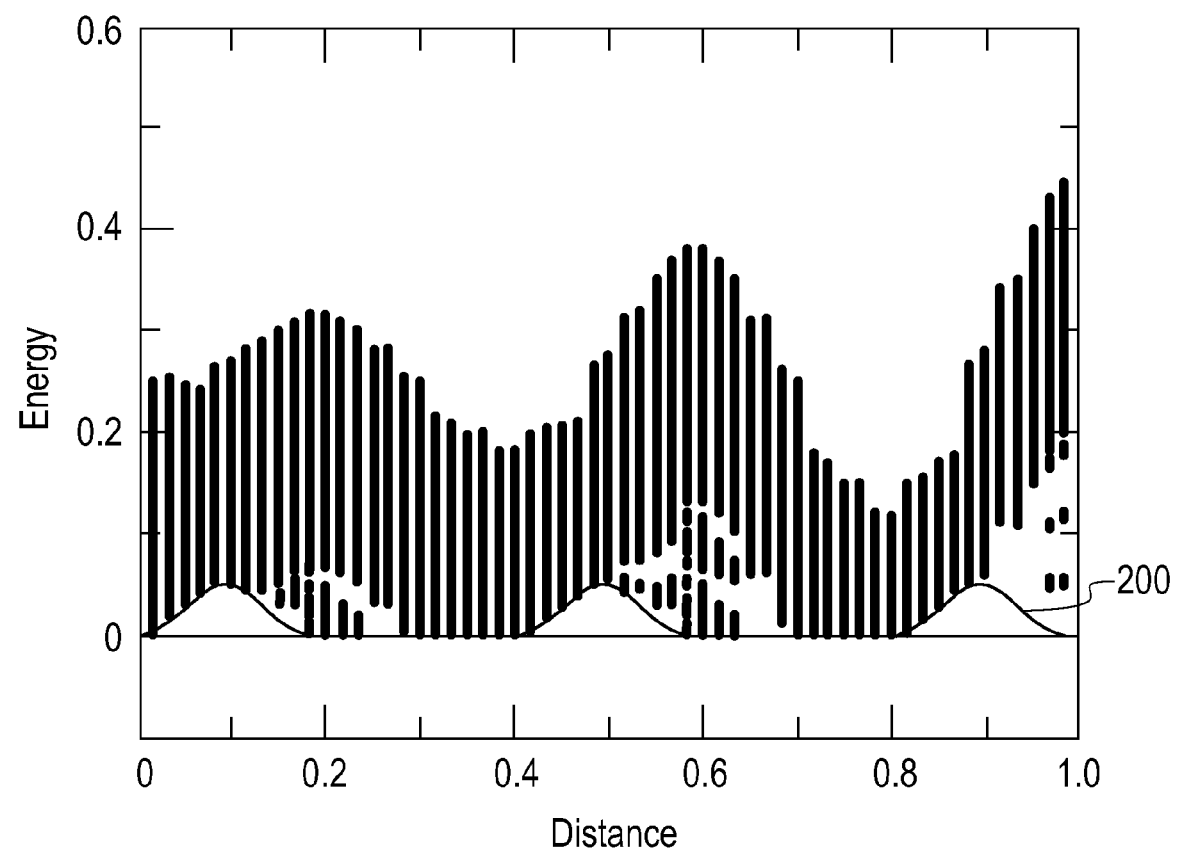
FIG. 6 is a spatial distribution of electron energy for forward moving electrons at a frequency equal to the inverse of the transit time between adjacent signal fingers within the 2-period (3 signal fingers) solid state Klystron according to the present invention.

Referring to FIG. 6, a spatial distribution of electron energy within the 2-period (3 signal fingers) solid state Klystron according to the present invention is shown for forward moving electrons. The frequency of the AC voltage signal applied to the signal gate 40 has a frequency equal to the inverse of the transit time between a pair of adjacent signal fingers 41, i.e., the period of oscillation is equal to the transit time between a pair of adjacent signal fingers 41. The potential energy imparted to the electrons due to the AC voltage signal is shown by the potential energy curve 200 in FIG. 6. As electrons travel from the source contact 10 to the drain contact 90, the kinetic energy of the electrons increases and bunching of electrons occurs. The same result is obtained for a mirror image implementation in which holes are used as carriers. The added kinetic energy may be much larger than the potential energy imparted by the signal gate 40, in analogy to high energy particles in a particle accelerator. The carrier bunching is the source of the power gain mechanism in the Klystron.

Figure 7:
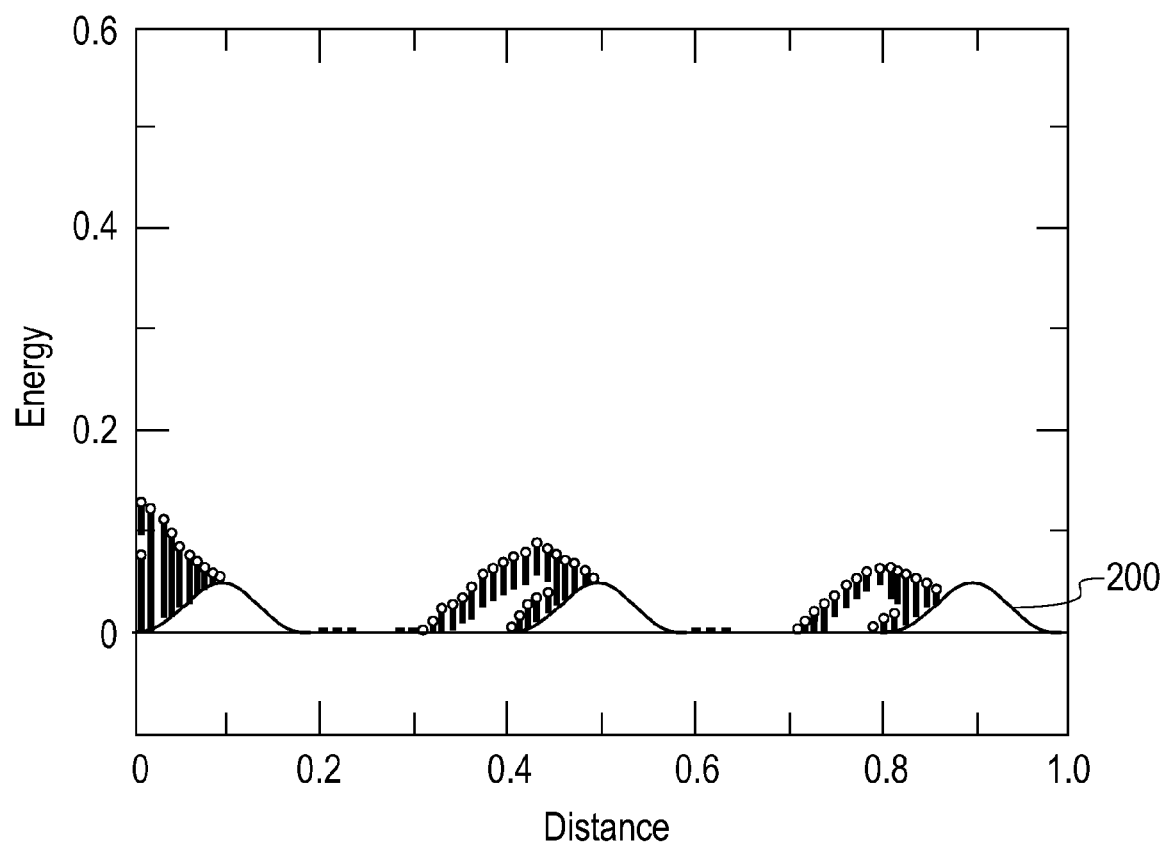
FIG. 7 is a spatial distribution of electron energy for backward moving electrons at a frequency equal to the inverse of the transit time between adjacent signal fingers within the 2-period (3 signal fingers) solid state Klystron according to the present invention.

Some carriers may travel in the opposite direction of the current flow during operation of an SSK. Referring to FIG. 7, a spatial distribution of electron energy within the 2-period (3 signal fingers) solid state Klystron according to the present invention is shown for backward moving electrons. The potential energy imparted to the electrons due to the AC voltage signal is shown by the potential energy curve 200 in FIG. 7. The fraction of backward moving electrons among all electrons in the electron beam is a function of the design parameters of the SSK, including the amplitude of the AC voltage signal relative to the first DC voltage bias and relative to the second DC voltage bias. This fraction may be contained to be less than 0.1, and under optimal conditions may be contained to be less than 0.01. Further, the kinetic energy of the backward moving electrons is much less than the kinetic energy of the forward moving electrons. While the faction of the backward moving electrons affect the effectiveness of an SSK, the overall operation of the SSK is not altered by the backward moving electrons.

Figure 8:
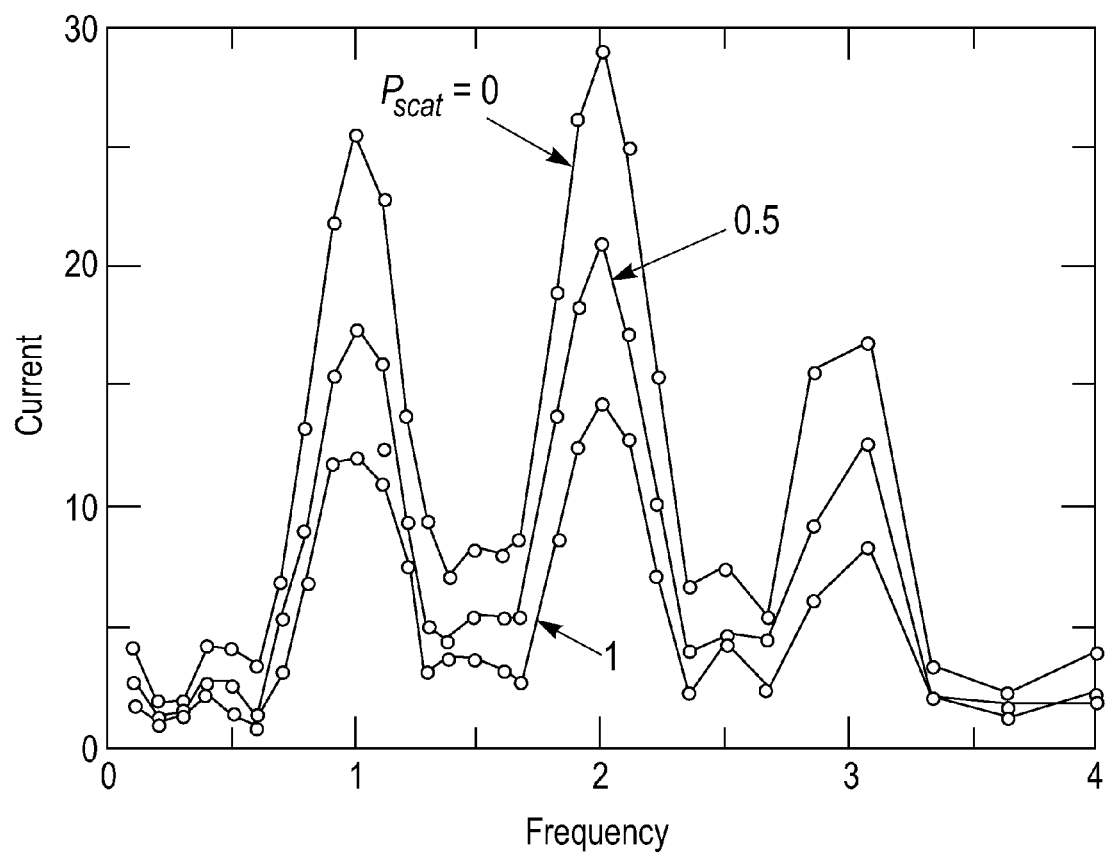
FIG. 8 is a simulated output current of the 2-period (3 signal fingers) solid state Klystron as a function of frequency.

Referring to FIG. 8, a simulated AC output current of the 2-period (3 signal fingers) SSK according to the present invention is shown as a function of frequency. The current is in relative units and the frequency is in units of the inverse of the transit time between a pair of adjacent signal fingers 41. $P_{scat}$ is a probability for back scattering normalized to the length of SSK, i.e., the distance between the source contact 10 and the drain contact 90. If the distance between a pair of adjacent fingers is one micron and the drift velocity of the carriers is $10^8$ cm/sec, then the frequency scale would be in the THz. Thus, the SSK according to the present invention is capable of operation above 1 THz.

The SSK according to the present invention offers a compact source of radiation at a frequency above 100 GHz, and preferably above 1 THz. The SSK according to the present invention can also be used as an ultra-high frequency amplifier at a frequency higher than 1 GHz, more preferably higher than 100 GHz, and most preferably higher than 1 THz.

The number of signal fingers 41 and the number of bias fingers 61, the spacings and widths of the signal fingers 41 and the bias fingers, as well as the geometry of the signal fingers 41, bias fingers 61, source contact 10, and the drain contact 90 may be adjusted for optimal operation of the SSK according to the present invention.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A carbon nanotube solid state Klystron structure comprising:
    at least one carbon nanotube;
    a source contact to said at least one carbon nanotube;
    a drain contact to said at least one carbon nanotube;
    a signal gate with at least two signal fingers, wherein said at least two signal fingers are located on said at least one carbon nanotube and between said source contact and said drain contact; and
    a bias gate with at least one bias finger, wherein said at least one bias finger is located on said at least one carbon nanotube.

2. The carbon nanotube solid state Klystron structure of claim 1, wherein said at least one bias finger is located between said at least two signal fingers.

3. The carbon nanotube solid state Klystron structure of claim 1, wherein said at least one carbon nanotube comprises a semiconducting carbon nanotube.

4. The carbon nanotube solid state Klystron structure of claim 1, wherein each of said source contact and said drain contact comprises a first metal.

5. The carbon nanotube solid state Klystron structure of claim 1, wherein each of said bias gate and said signal gate comprises a second metal.

6. The carbon nanotube solid state Klystron structure of claim 1, wherein a width of each of said at least one signal finger is equal to or less than about ½ of the smallest spacing between adjacent signal fingers.

7. The carbon nanotube solid state Klystron structure of claim 1, wherein a diameter of said at least one carbon nanotube is in the range from about 1.0 nm to about 10 nm.

8. A semiconductor solid state Klystron structure comprising:
    at least one semiconductor wire;
    a source contact to said at least one semiconductor wire;
    a drain contact to said at least one semiconductor wire;
    a signal gate with at least two signal fingers, wherein said at least two signal fingers are located on said at least one semiconductor wire and between said source contact and said drain contact; and
    a bias gate with at least one bias finger, wherein said at least one bias finger is located on said at least one semiconductor wire.

9. The semiconductor solid state Klystron structure of claim 8, wherein said at least one semiconductor wire comprises a material selected from the group consisting of $In_xGa_{1-x}As$ and the value of x is in the range from 0 to 1.

10. The semiconductor solid state Klystron structure of claim 8, wherein said at least one bias finger is located between the at least two signal fingers.

11. The semiconductor solid state Klystron structure of claim 8, wherein each of said source contact and said drain contact comprises a first metal.

12. The semiconductor solid state Klystron structure of claim 8, wherein each of said bias gate and said signal gate comprises a second metal.

13. The semiconductor solid state Klystron structure of claim 8, wherein a width of each of said at least one signal finger is equal to or less than about ½ of the smallest spacing between adjacent signal fingers.

14. The semiconductor solid state Klystron structure of claim 8, wherein a width of said at least one semiconductor nanowire is in a range from about 2.0 nm to about 40 nm.

15. The semiconductor solid state Klystron structure of claim 8, wherein a thickness of said at least one semiconductor nanowire is in a range from about 2.0 nm to about 40 nm.

16. The semiconductor solid state Klystron structure of claim 9, wherein said at least one semiconductor wire comprises a material with long ballistic mean free paths on the order of the length of said at least one semiconductor wire.

* * * * *